US006164808A

United States Patent [19]

Shibata et al.

[11] Patent Number: 6,164,808

[45] Date of Patent: Dec. 26, 2000

[54] THREE-DIMENSIONAL DATA INPUT DEVICE

[75] Inventors: Atsumi Shibata, Wako; Michiyasu Tano, Tokyo, both of Japan

[73] Assignees: Murata MFG. Co., Ltd.; Data Tec Co., Ltd., both of Japan

[21] Appl. No.: 08/797,306

[22] Filed: Feb. 7, 1997

[30] Foreign Application Priority Data

Feb. 9, 1996 [JP] Japan .................................... 8-024487

[51] Int. Cl.[7] .................................................. G05B 19/402

[52] U.S. Cl. .......................... 364/190; 345/163; 345/164

[58] Field of Search .................................... 345/156, 157, 345/163, 164, 167; 364/190

[56] References Cited

U.S. PATENT DOCUMENTS 5,453,758 9/1995 Sato ........................................ 345/158
5,561,445 10/1996 Miwa et al. ............................ 345/163

*Primary Examiner*—William Grant
*Assistant Examiner*—Chad Rapp
*Attorney, Agent, or Firm*—Bachman & LaPointe, P.C.

[57] ABSTRACT

A three-dimensional data input device for a computer having a display screen includes a ball rotatably provided in a device body, and sensors for detecting rotation magnitudes of the ball along two axes on a plane and outputting displacement signals indicative of the detected rotation magnitudes, respectively. The device further includes a gyro for detecting an angular velocity of the device body about an axis extending at a given angle relative to the foregoing plane and outputting an angular velocity signal indicative of the detected angular velocity. The device further includes switches for outputting a selection signal in response to operation of at least one of selection buttons. The device derives displacement data based on the foregoing displacement signals and angular data based on the foregoing angular velocity signal and outputs the displacement data, the angular data and the selection signal to the computer. The computer moves a corresponding object on the screen on a plane corresponding to the displacement data and rotates the corresponding object corresponding to the angular data bout one of given axes selected by the selection signal.

7 Claims, 10 Drawing Sheets

FROM SWITCHES
FROM GYRO
FROM ROTARY ENCODERS
SELECTION SIGNAL (S)
ANGULAR VELOCITY SIGNAL
PULSE SIGNAL (S)
121
A/D CONVERTER
122
NOISE FILTER
153
DEAD ZONE PROCESSING SECT
151
PULSE COUNTERS
152
DISPLACEMENT DATA GENERATING SECT
154
INTEGRATING CKT
155
ANGULAR DATA GENERATING SECT
156
DATA OUTPUT SECT
CPU
15
TO OUTPUT INTERFACE 14

THREE-DIMENSIONAL DATA INPUT DEVICE

BACKGROUND OF THE INVENTION

1. Field of the Invention

The present invention relates to a data input device for a computer and, in particular, to a device which enables inputting three-dimensional data into a computer.

2. Description of the Prior Art

As data input devices for computers, pointing devices, such as mice and digitizers, have been widely used cooperatively with keyboards. FIG. 15 is a diagram for explaining how to use a conventional mouse C as an example of the pointing devices. As shown in the figure, the mouse C is connected to a data input section of a computer B via a given mouse interface. Through the software in the computer B, displacement magnitudes of a pointer (or a pointed object) in the horizontal (x-axis) and vertical (z-axis) directions on the screen are controlled to correspond to displacement magnitudes of the mouse C in the leftward/rightward (x-axis) and forward/backward (z-axis) directions on the desk. Accordingly, when an operator moves the mouse C in a desired direction on the desk, the pointer displaces correspondingly on the screen of the computer B. However, the screen operation using the mouse C has been limited to be two-dimensional. This also applies to the other data input devices of the same kind, such as digitizers.

As shown in FIG. 16, in the simultaneous processing, such as multitask processing or multiwindow processing, windows a, b and c to be processed are displayed to as to overlap with each other on the screen. In this case, it is necessary to open the windows in sequence from the uppermost window. This complicates the operation and further tends to induce the operation errors when controlling a number of the windows. This has been resulted from the fact that the conventional data input devices can only achieve the two-dimensional data inputting, and thus the offered software should correspond to such two-dimensional data inputting.

On the other hand, in the CAD (computer aided design) employed in the construction machine designing or the like, the three-dimensional data inputting has been popular. However, since the conventional data input devices can only support the two-dimensional data inputting, functions provided by the CAD can not be fully utilized, thereby causing inconveniences in operation.

SUMMARY OF THE INVENTION

Therefore, it is an object of the present invention to provide an improved data input device which is capable of inputting three-dimensional data into a computer with a simple structure.

According to one aspect of the present invention, a three-dimensional data input device for a computer having a display screen is provided. The device includes: a ball rotatably provided in a device body; sensor means for detecting rotation magnitudes of the ball along first and second axes on a plane and outputting displacement signals indicative of the rotation magnitudes, respectively; an angular velocity sensor for detecting an angular velocity of the device body about a third axis extending at a given angle relative to the plane and outputting an angular velocity signal indicative of the angular velocity; switching means for outputting a selection signal in response to operation of at least one of selection buttons; and data processing means for deriving displacement data based on the displacement signals and angular data based on the angular velocity signal and outputting the displacement data, the angular data and the selection signal to the computer. The computer moves a corresponding object on the screen on a plane corresponding to the displacement data and rotates the corresponding object corresponding to the angular data bout one of given axes selected by the selection signal.

It may be arranged that the first, second and third axes are orthogonal to each other.

It may be arranged that the number of the given axes is three which are orthogonal to each other.

It may be arranged that the selection signal further functions so as to perform zooming of the corresponding object on the screen.

According to another aspect of the present invention, a three-dimensional data input device for a computer having a display screen is provided. The device includes: a plurality of angular velocity sensors arranged on a plurality of axes, respectively, the axes being positioned so as to have a given angle therebetween, each of the angular velocity sensors detecting an angular velocity about the corresponding axis and producing an angular velocity signal indicative of the detected angular velocity; and angular data generating means for producing angular data each indicative of a rotation angle about the corresponding axis, based on the corresponding angular velocity signal and further based on the angular velocity signal relative to the axis other than the corresponding axes. The computer rotates a corresponding object on the screen corresponding to the angular data.

It may be arranged that the angular data generating means includes means for converting each of the angular velocity signals into a digital signal having a constant amplitude for a given time period, and a coordinate conversion section for converting each of the digital signals to a coordinate signal corresponding to a rotation magnitude of the corresponding object on the screen.

It may be arranged that the angular data generating means includes: a signal branching section for branching each of the coordinate signals into at least two; a plurality of filters for removing different frequency components from the branched signals of each of the coordinate signals; a signal combining portion for combining the branched signals of each of the coordinate signals outputted from the filters to produce a combined signal; and means for producing each of the angular data based on the combined signal, and that each of the angular data is fed to the coordinate conversion section as a conversion parameter and as the angular velocity signal relative to other than the corresponding axis, so as to be used upon conversion to the coordinate signal.

It may be arranged that the angular data generating means includes means for determining no occurrence of the angular velocity about the corresponding axis when variation of angular components contained in the corresponding angular velocity signal is within a preset dead zone of the angular velocity sensor.

It may be arranged that the angular data generating means includes temperature correction means for correcting each of the angular velocity signals based on a monitored temperature around the angular velocity sensors.

BRIEF DESCRIPTION OF THE DRAWINGS

The present invention will be understood more fully from the detailed description given hereinbelow, taken in conjunction with the accompanying drawings.

In the drawings:

FIGS. 1A and 1B are diagrams schematically showing structures of a three-dimensional mouse according to a first preferred embodiment of the present invention, wherein FIG. 1A is a top sectional view of the mouse and FIG. 1B is a side sectional view of the mouse;

FIGS. 9A and 9B are diagrams for explaining an effect of the averaging process, wherein FIG. 9A shows a waveform before the averaging process and FIG. 9B shows a waveform after the averaging process;

FIGS. 12A and 12B are diagrams for explaining an effect of the offset cancel process, wherein FIG. 12A shows a waveform before the offset cancel process and FIG. 12B shows a waveform after the offset cancel process;

FIGS. 14A is a diagram for explaining a case where two-dimensional data are transmitted using a conventional data transmission format, while

DESCRIPTION OF THE PREFERRED EMBODIMENT

Now, preferred embodiments of three-dimensional data input devices according to the present invention will be described hereinbelow with reference to the accompanying drawings.

First Embodiment

Figure 1A:
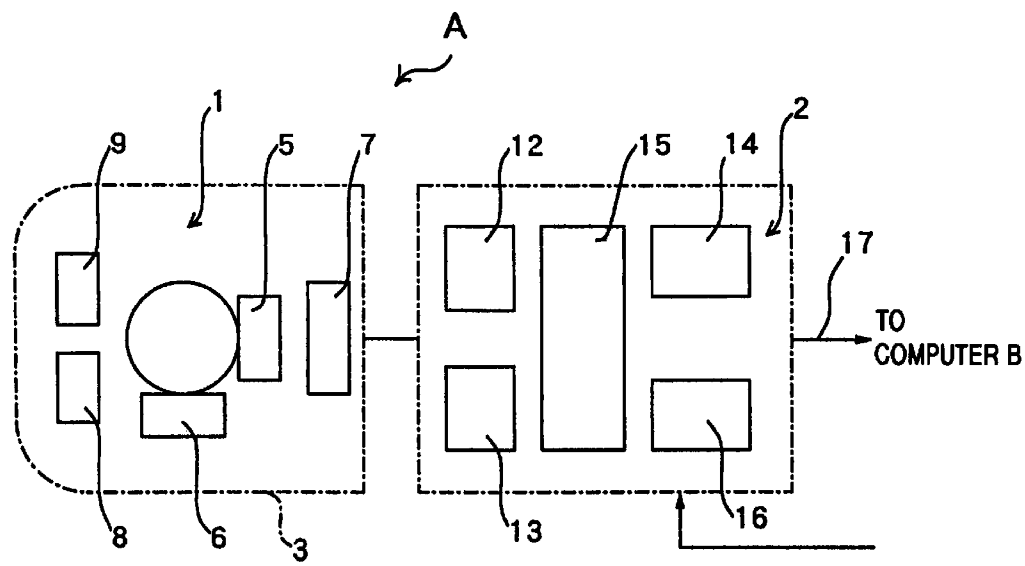
Figure 1B:
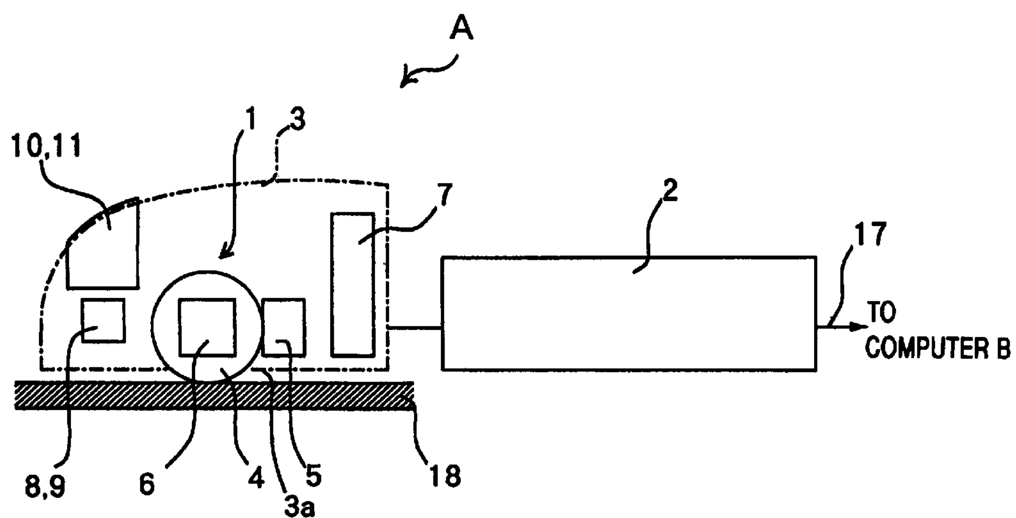

FIGS. 1A and 1B are diagrams showing structures of a three-dimensional mouse A according to the preferred embodiment of the present invention, wherein FIG. 1A is atop sectional view of the mouse A and FIG. 1B is a side sectional view of the mouse A.

The three-dimensional mouse A includes a sensor section 1 and a data processing section 2. The sensor section 1 includes a mouse body 3 having a size which can be held by an operator's hand. In the mouse body 3 are arranged a ball 4 which is rotatable in all directions, two rotary encoders 5 and 6 to be used as rotation detecting sensors for monitoring the rotation of the ball 4, a gyro 7 to be used as an angular velocity sensor for monitoring the angular velocity of the mouse body 3, and two switches 8 and 9.

The ball 4 is arranged so as to be partially exposed to the outside through an opening **3*a* formed at the bottom of the mouse body 3. Thus, through contact of exposed portions of the ball 4 with a mouse pad 18, the ball 4 is arranged to rotate following movement of the mouse body 3. The rotary encoders 5 and 6 are arranged so as to be in constant contact with the surface of the ball 1 in the forward/backward and leftward/rightward directions of the mouse body 3, that is, on the horizontal z- and x-axes in FIG. 3A, which are orthogonal to each other. The rotary encoders 5 and 6 output displacement signals indicative of rotation magnitudes of the ball 4 along the respective horizontal axes. The gyro 7 is arranged on a vertical axis orthogonal to a plane defined by the foregoing two axes and outputs an angular velocity signal indicative of a rotation magnitude of the mouse body 3 about the vertical axis. Each of the switches 8 and 9 is associated with one of operation buttons 10 and 11 arranged on the upper surface of the mouse body 3 so as to output a selection signal S1 or S2 when the corresponding one of the operation buttons 10 and 11** is depressed.

Each of the rotary encoders 5 and 6 includes a roller which is in constant contact with the ball 4, and further includes a rotary plate with slits provided on a rotation shaft of the roller and a photoelectric sensor. When the ball 4 rotates, the rotary plate also rotates via the roller and the rotation shaft thereof, and the photoelectric sensor detects states where light is intercepted by the rotary plate, so that a displacement signal (pulse signal) indicative of a rotation magnitude of the ball 4 along the corresponding axis or in the corresponding direction is outputted.

The gyro 7 may be of any type as long as the angular velocity of the mouse body 3 can be detected with high accuracy. On the other hand, it is preferable to use, for example, a piezoelectric vibration gyro, particularly, for example, a piezoelectric vibration gyro (ENC-051) manufactured by MURATA MFG. CO., LTD. This piezoelectric vibration gyro is small in size and weight and thus attachable in the mouse body 3, and further high in productivity so that large reduction in manufacturing cost can be expected.

The sensor section detects, through the rotary encoder 5, a displacement magnitude of the mouse body 3 (rotation magnitude of the ball 4) in the forward/backward direction thereof (z-axis in FIG. 3A) and outputs a displacement signal P1 indicative of that displacement magnitude of the mouse body 3. The sensor section 1 further detects, through the rotary encoder 6, a displacement magnitude of the mouse body 3 (rotation magnitude of the ball 4) in the leftward/rightward direction thereof (x-axis in FIG. 3A) and outputs a displacement signal P2 indicative of that displacement magnitude of the mouse body 3. When the mouse body 3 is rotated about the foregoing vertical axis, the sensor section 1 detects, through the gyro 7, the rotation of the mouse body 3 and outputs an angular velocity signal R indicative of a rotation angle of the mouse body 3. The sensor section 1 sends the foregoing signals P1, P2 and R to the data processing section 2 along with the foregoing selection signal S1 or S2 or signals S1 and S2.

The data processing section 2 includes an analog interface 12, a pulse interface 13, an output interface 14, a CPU 15 and a memory 16. Calculation results in the data processing section 2 are sent to a computer B through a signal cable 17, while the power is supplied to the data processing section 2 from the side of the computer B via a power line incorporated in the signal cable 17.

The analog interface 12 includes an A/D converter for converting the angular velocity signal R detected by the gyro 7 to a digital signal, a noise filter (bandpass filter) for removing DC components and high-frequency noise components contained in the digital signal, and an amplifier for amplifying an output of the noise filter to an input level of the CPU 15.

The pulse interface 13 includes a waveform shaping circuit for shaping the pulse signals (displacement signals) P1 and P2 detected by the rotary encoders 5 and 6, and amplifiers for amplifying the shaped pulse signals to input levels of the CPU 15.

Figure 2:
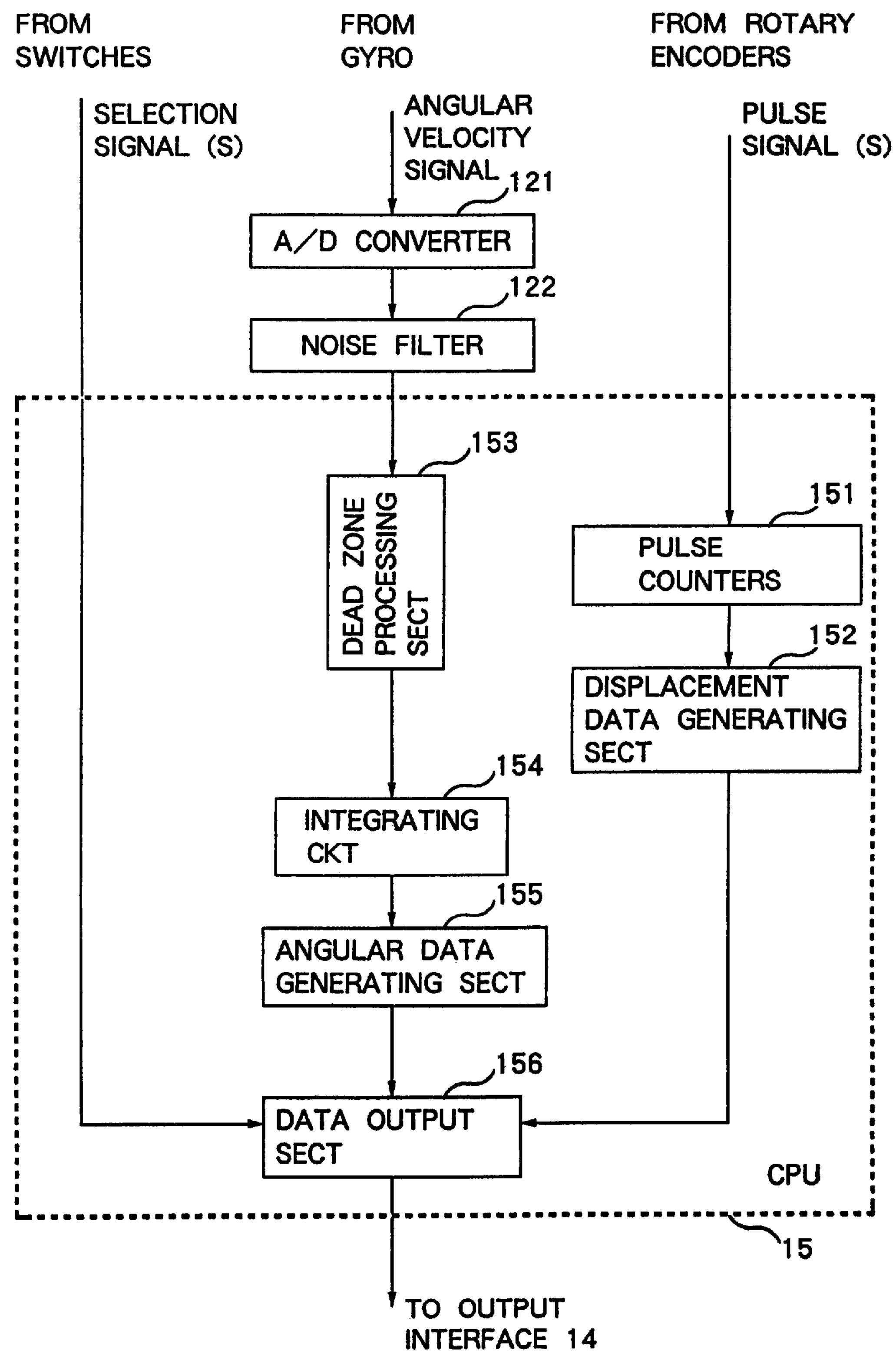
FIG. 2 is a diagram showing functional blocks formed in a data processing section of the three-dimensional mouse shown in FIGS. 1A and 1B.

The CPU 15 is, for example, in the form of a one-chip microprocessor, and establishes the required functions in the data processing section 2 through data transfer with the memory 16. The memory 16 includes a ROM for storing programs to be read and executed by the CPU 15, and a RAM for storing results of the processing executed by the CPU 15. FIG. 2 shows functional blocks formed in the data processing section 2 by cooperation of the CPU 15 and the programs stored in the memory 16. In FIG. 2, an A/D converter 121 and a noise filter 122 are included in the analog interface 12 as described above, and details of the other interfaces and the foregoing amplifiers are omitted for simplicity.

As shown in FIG. 2, the data processing section 2 includes pulse counters 151 for counting the numbers of pulses of the pulse signals P1 and P2 inputted via the pulse interface 13, and a displacement data generating section 152 for generating displacement data of the mouse body 3 in the corresponding directions based on the numbers of pulses of the pulse signals P1 and P2, respectively. As appreciated, these displacement data correspond to the conventional two-dimensional data inputting and represent displacement magnitudes of a pointer (or a pointed object) on the display screen of the computer B in the corresponding directions (z- and x-axes on the display screen in FIG. 3A).

The data processing section 2 further includes a dead zone processing section 153, an integrating circuit 154 and an angular data generating section 155 which are provided for deriving a rotation angle, that is, angular data, of the mouse body 3 based on the angular velocity signal R which has been detected by the gyro 7 and processes through the A/D converter 121 and the noise filter 122. The angular data represents a rotation angle of the pointer on the display screen, which will be described later in detail.

The dead zone processing section 153 is set to determine that the mouse body 3 is not rotated, that is, is stopped, when variation in amplitude of the angular velocity signal R is within a range which has been preset as a dead zone. While determining that the mouse body 3 is stopped, the dead zone processing section 153 performs a drift correction or an origin correction for the output of the gyro 7 so as to forcibly return a relative angle of the mouse body 3 to the origin (zero). The integrating circuit 154 integrates the signal from the dead zone processing section 153 for a given time, and the angular data generating section 155 produces angular data, that is, a rotation angle, of the mouse body 3 based on the output from the integrating circuit 154.

The data processing section 2 further includes a data output section 156 which receives the selection signal/signals S1 or/and S2 from the switches 8 and 9, the displacement data of the mouse body 3 from the displacement data generating section 152 and the angular data of the mouse body 3 from the angular data generating section 155 and processes them so as to match the output interface 14 which then outputs them to the computer B via the signal cable 17 in a given data format as three-dimensional data.

Since the gyro 7 is sensitive to temperatures, temperature correction means is provided for preventing an influence to the calculation result even if the angular velocity signal R is subjected to an influence due to change in temperature. For this purpose, correction data have been obtained through experiments relative to temperatures and stored in the ROM as a correction table. Upon detection of a temperature around the gyro 7 by a temperature detection sensor (not shown), the temperature correction means corrects the angular velocity signal based on the detected temperature and the stored correction table. The temperature detection sensor may be a thermistor incorporated in the data processing section 2, whose outputs are read by the executed program at every given timing.

Figure 3A:
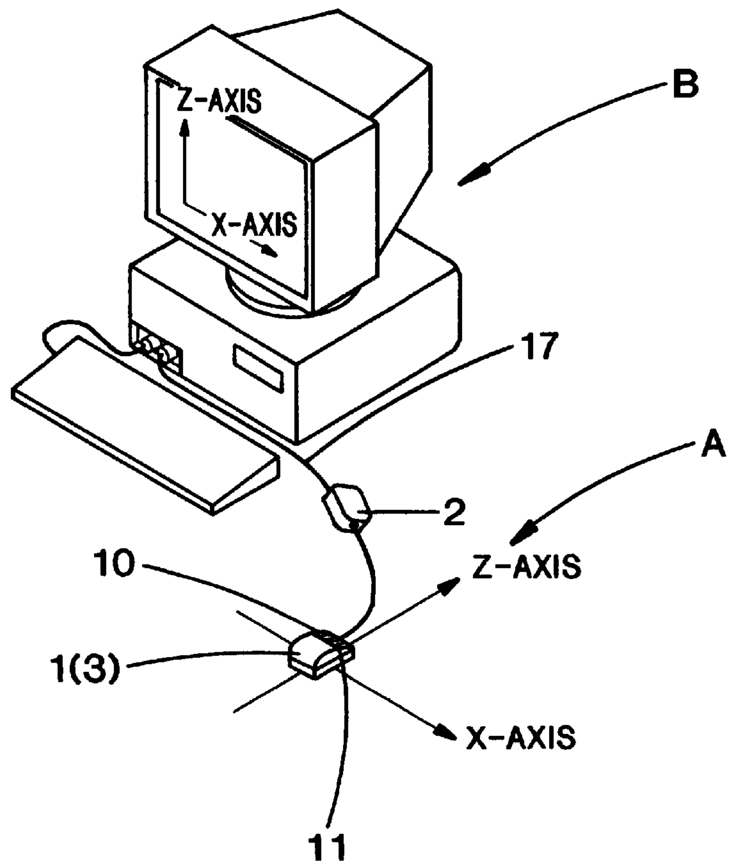
FIG. 3A is a diagram for explaining how to use the three-dimensional mouse shown in FIGS. 1A and 1B.
Figure 3B:
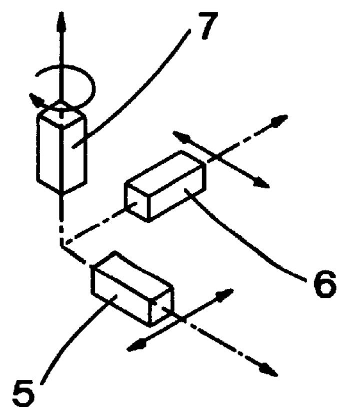
FIG. 3B is a diagram for explaining directions of the movement of the three-dimensional mouse to be detected by sensors provided in the mouse.

With the three-dimensional mouse A having the foregoing structure, two-dimensional data inputting to the computer B is achieved by moving the mouse body 3 in the forward/backward (z-axis) and leftward/rightward (x-axis) directions as shown in FIG. 3A. On the other hand, three-dimensional data inputting to the computer B is achieved by rotating the mouse body 3 by a desired angle. Then, as shown in FIG. 3B, the gyro 7 detects the angular velocity and outputs the angular velocity signal R to the data processing section 2. The data processing section 2 derives the angular data based on the angular velocity signal R and outputs it to the computer B as described above.

Now, an operation of the three-dimensional mouse A will be described in further detail with reference to FIGS. 4 and 5A–5D.

Figure 4:
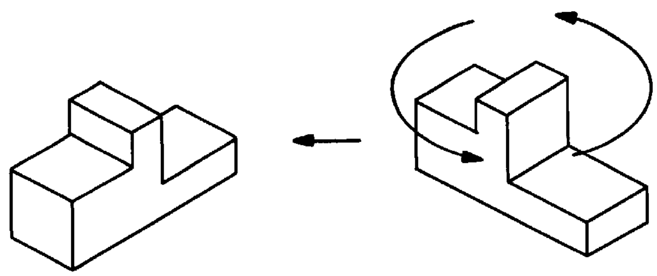
FIG. 4 is an explanatory diagram showing an example of screen display of a computer when three-dimensional data is inputted.
Figure 5A:
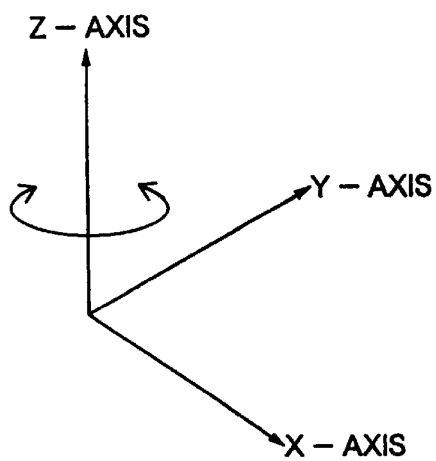
FIGS. 5A to 5B are diagrams for explaining an operation of the three-dimensional mouse shown in FIGS. 1A and 1B.

FIG. 5A shows a case wherein the mouse body 3 is rotated while the operation button 10 is pushed. In this case, the selection signal S1 (switch 8) and the angular velocity signal R (gyro 7) are fed to the data processing section 2. The data processing section 2 produces the angular data from the angular velocity signal R and sends the angular data and the selection signal S1 to the computer B. Then, as shown in FIG. 5A and FIG. 4, the computer B rotates a pointed object on the screen by an angle corresponding to the angular data and about the z-axis which has been selected by the selection signal S1 among the x-, y- and z-axes.

Figure 5B:
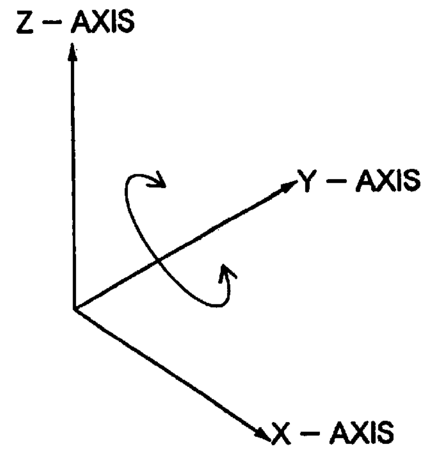

FIG. 5B shows a case wherein the mouse body 3 is rotated while the operation button 11 is pushed. In this case, the selection signal S2 (switch 9) and the angular velocity signal R (gyro 7) are fed to the data processing section 2. The data processing section 2 produces the angular data from the angular velocity signal R and sends the angular data and the selection signal S2 to the computer B. Then, as shown in FIG. 5B, the computer B rotates a pointed object on the screen by an angle corresponding to the angular data and about the y-axis as selected by the selection signal S2.

Figure 5C:
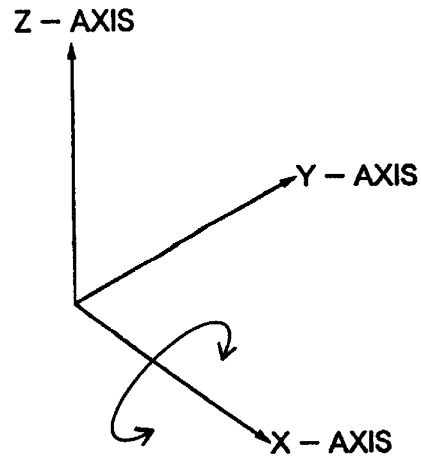

FIG. 5C shows a case wherein the mouse body 3 is rotated while the operation buttons 10 and 11 are pushed. In this case, the selection signals S1 and S2 and the angular velocity signal R (gyro 7) are fed to the data processing section 2.

The data processing section 2 produces the angular data from the angular velocity signal R and sends the angular data and the selection signals S1 and S2 to the computer B. Then, as shown in FIG. 5C, the computer B rotates a pointed object on the screen by an angle corresponding to the angular data and about the x-axis as selected by the selection signals S1 and S2.

Figure 5D:
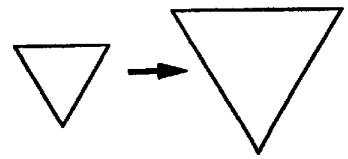

It may be arranged that the movement of the pointed object on the screen in the x- and z-axes directions is controlled by moving the mouse body 3 in the leftward/rightward (x-axis) and forward/backward (z-axis) directions of the mouse body 3, and the movement of the pointed object on the screen in the y-axis direction (depth direction) is controlled by moving the mouse body 3 in the forward/backward (z-axis) direction of the mouse body 3 while pushing one of the operation buttons 10 and 11. For example, when the mouse body 3 is moved in the forward/backward direction while pushing the operation button 10, the sensor section 1 outputs the selection signal S1 (switch 8), the pulse signals P1 and P2 (rotary encoders 5 and 6) and the angular velocity signal R (gyro 7) to the data processing section 2. The data processing section 2 produces the angular data (zero) based on the angular velocity signal R, the displacement data based on the pulse signal P1 and the displacement data (zero) based on the pulse signal P2 and sends them to the computer B along with the selection signal S1. Then, as shown in FIG. 5D, the computer B performs zooming of the pointed object on the screen based on the displacement data (P1) and the selection signal S1.

As appreciated, since the screen operation of the pointed object by the computer B is determined depending on how to process the input data form the three-dimensional mouse A on an application, the operation of the three-dimensional mouse A is not limited to the foregoing manner.

In the foregoing preferred embodiment, the mouse body 3 is provided with two operation buttons. However, the number of the operation buttons is not limited to two. For example, a third operation button may be arranged on the left side of the mouse body 3 so that the two operation buttons on the upper side of the mouse body 3 are operated by the first and second fingers while the third operation button is operated by the first and second fingers while the third operation button is operated by the thumb. With this arrangement, more data can be fed to the computer B from the three-dimensional mouse A.

As described above, according to the first preferred embodiment, the three-dimensional data including the displacement data and the angular data of the mouse body 3 and the selection signal/signals can be simultaneously outputted from the three-dimensional mouse A. Thus, as compared with the conventional mouse which performs the screen operation cooperatively with the keyboard, a large amount of data can be fed to the computer B only by operating the mouse body 3 so that the high-level screen operation can be achieved with simple operation.

Second Embodiment

The second preferred embodiment of the present invention will be described hereinbelow with reference to FIGS. 6–14.

Figure 6:
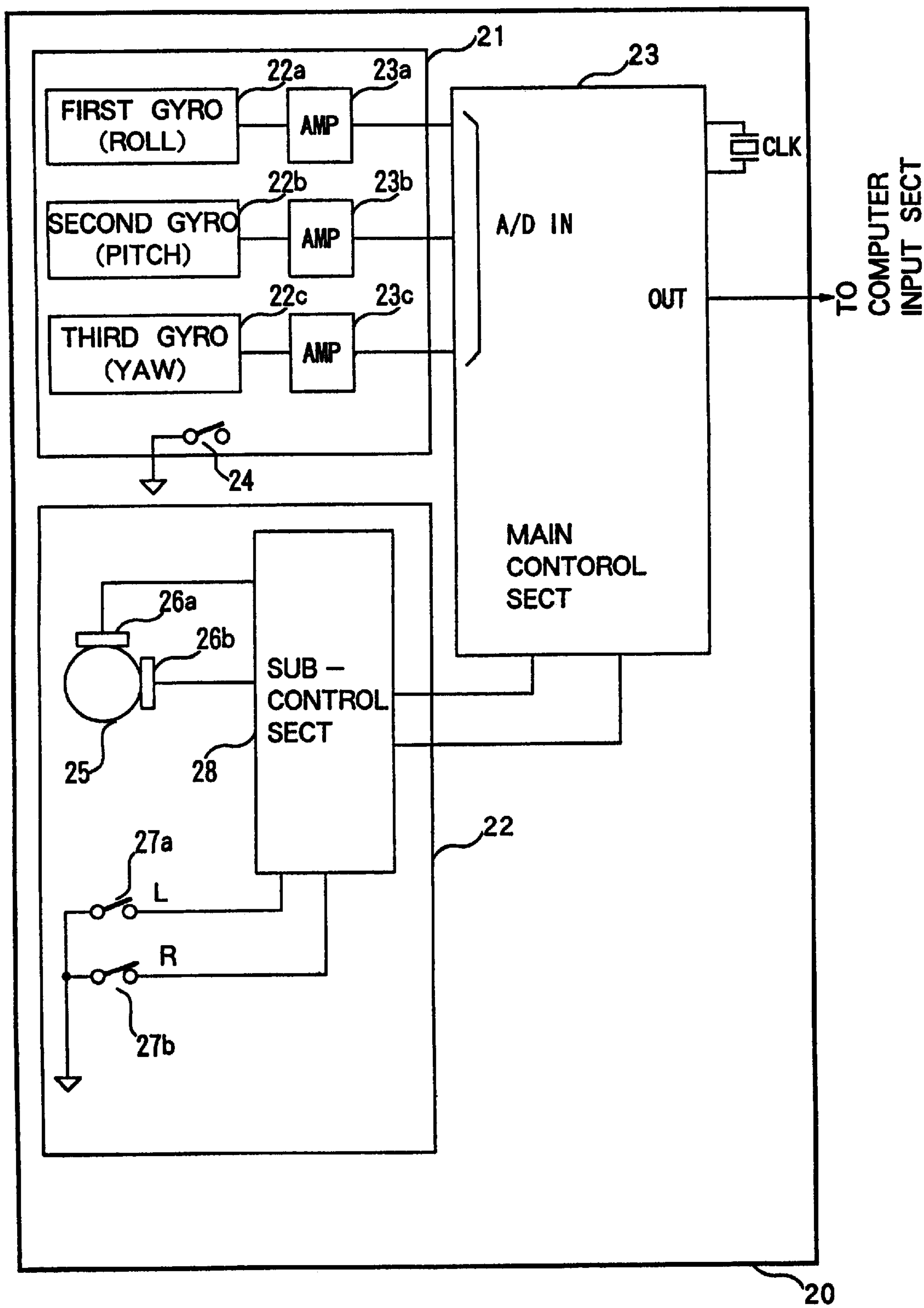
FIG. 6 is a diagram schematically showing a structure of a three-dimensional mouse according to a second preferred embodiment of the present invention.

FIG. 6 is a diagram showing a structure of a three-dimensional mouse 20 according to the second preferred embodiment of the present invention. In the figure, the three-dimensional mouse 20 includes a gyro section 21, a mouse section 22 and a main control section 23.

The gyro section 21 includes first to third gyros 22*a*, 22*b* and 22*c*, each being identical with the gyro 7 in the first preferred embodiment, arranged on three axes, respectively, that is, x-, y- and z-axes orthogonal to each other in this preferred embodiment. The first gyro 22*a* corresponds to the roll angle (angle about x-axis), the second gyro 22*b* to the pitch angle (angle about y-axis) and the third gyro 22*c* to the yaw angle (angle about z-axis). Angular velocity signals outputted from the gyros 22*a*, 22*b* and 22*c* are amplified through amplifiers 23*a*, 23*b* and 23*c*, respectively, to signal levels which can be processed at the main control section 23. The gyro section 21 is further provided with a click button 24 for selection between three-dimensional data inputting and two-dimensional data inputting.

The mouse section 22 enables the conventional two-dimensional data inputting. The mouse section 22 includes a rotatable ball 25, rotary encoders 26*a* and 26*b* for detecting rotation magnitudes of the ball 25, switches 27*a* and 27*b* for outputting a selection signal in response to operation of one of operation buttons (not shown), and a subcontrol section 28. Except for the subcontrol section 28, the elements in the mouse section 22 are the same as the corresponding elements in the foregoing first preferred embodiment. The subcontrol section 28 is in the form of a control IC and produces displacement data based on the rotation magnitudes detected by the rotary encoders 26*a* and 26*b* as in the foregoing first preferred embodiment. As appreciated, when the click button 24 is switched to the two-dimensional data inputting, the three-dimensional mouse 20 can be used like the conventional two-dimensional mouse. On the other hand, when the click button 24 is switched to the three-dimensional data inputting, the three-dimensional mouse 20 can be used like the three-dimensional mouse A in the first preferred embodiment, using an output of the third gyro (yaw angle) 22*c* as the output of the gyro 7 in the first preferred embodiment.

Further, when the click button 24 is switched to the three-dimensional data inputting, the roll, pitch and yaw angles of the mouse 20 are derived based on the angular velocities detected by the corresponding gyros and sent to the compute, which will be described later in detail.

Figure 7:
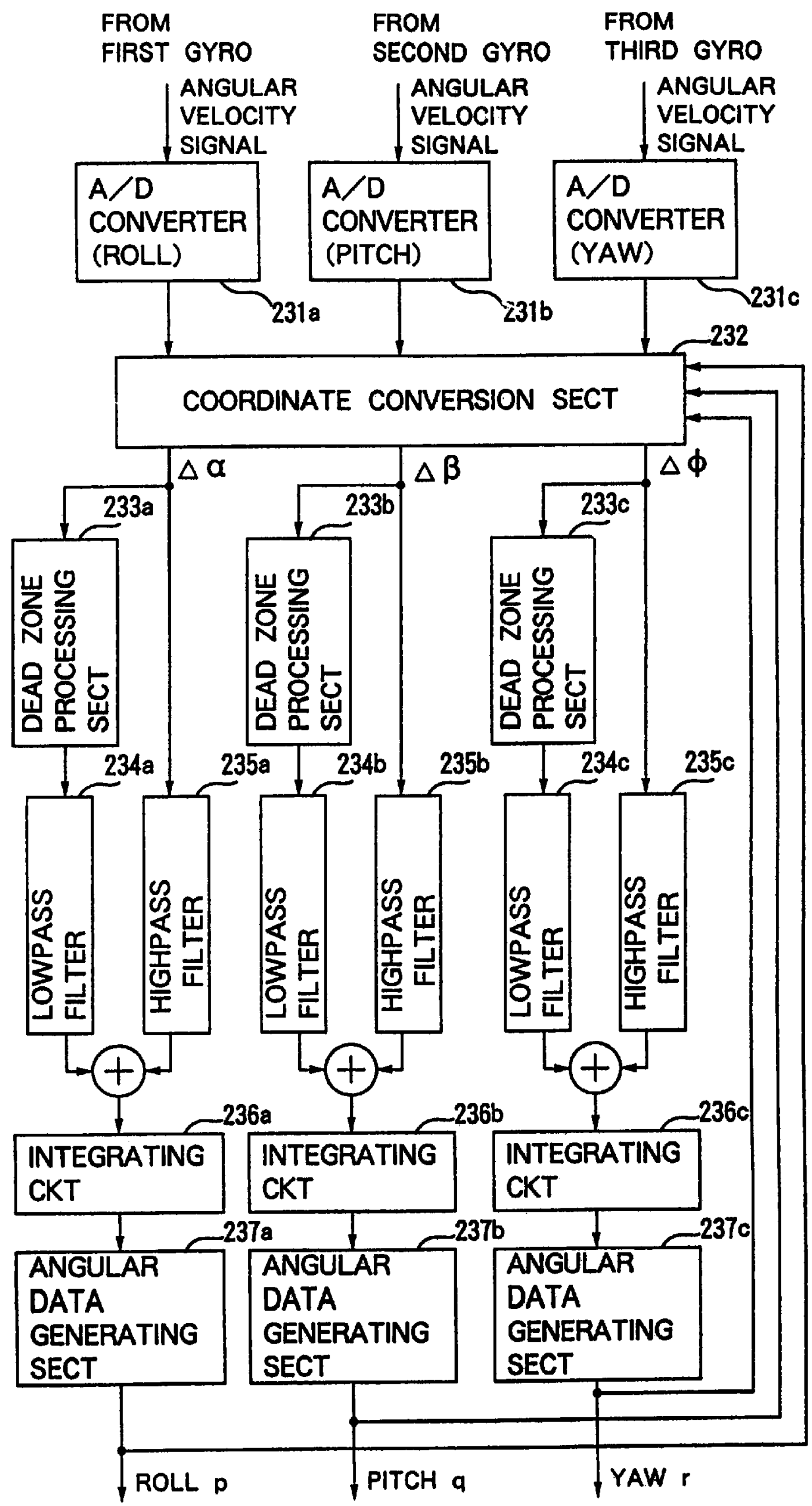
FIG. 7 is a diagram showing functional blocks formed in a main control section of the three-dimensional mouse shown in FIG. 6.

The main control section 23 includes a one-chip CPU operated at timings defined by the given clock and a memory storing given programs and others. The main control section 23 produces two-dimensional or three-dimensional data for inputs to the computer based on outputs from the gyro section 21 or the mouse section 22. FIG. 7 shows functional blocks formed in the main control section 23 by cooperation of the CPU and the programs stored in the memory.

As shown in FIG. 7, the main control section includes A/D converters 231*a*, 231*b* and 231*c* for converting angular velocity signals outputted from the respective gyros 22*a*, 22*b* and 22*c*. Each of the A/D converters performs an averaging process upon digitizing the input signal.

Figure 8:
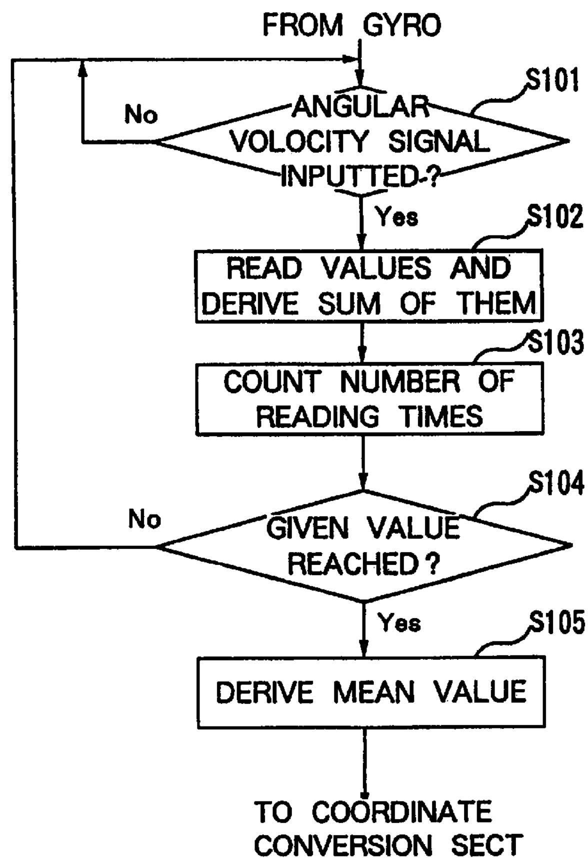
FIG. 8 is a flowchart of an averaging process to be executed at the main control section of the three-dimensional mouse shown in FIG. 6.
Figure 9A:
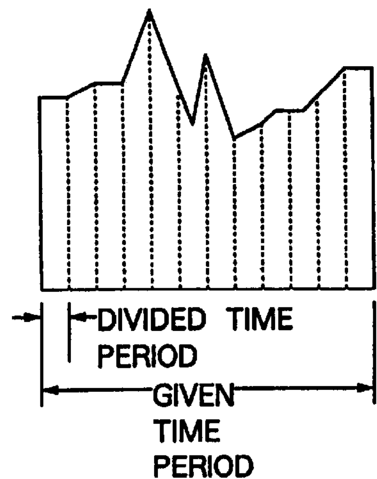
Figure 9B:
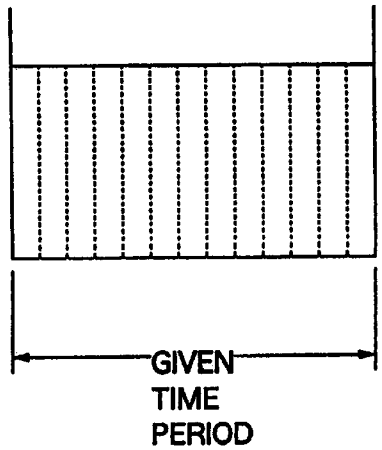

FIG. 8 is a flowchart showing this averaging process. First, step S101 checks whether an angular velocity signal is inputted from the corresponding gyro. If positive, step S102 reads fast values of the input signal per short divided time period and derives the sum of the read values. Then, step S103 counts the number of reading times. When the counted value has reached a given value at step S104, step S105 derives a mean value of the input signal in a given time period. In this preferred embodiment, the given time period is 20 ms and the divided time period for reading is 17 $\mu$s. Through this averaging process, the angular velocity signal having a waveform shown in FIG. 9A is averaged as shown in FIG. 9B so that the accuracy of the angular data obtained through the trapezoidal rule integration of angles is largely enhanced. The outputs of the A/D converts 231*a*, 231*b* and 231*c* are fed to a coordinate conversion section 232.

The coordinate conversion section 232 converts each of the digitized angular velocity values or components to, for example, Eulerian coordinates. Upon such a conversion, the angular velocity components, more specifically, feedback angular data which will be described later, relative to the other two axes are used as conversion parameters. That is, the signal components relating to the other two axes are also considered upon each conversion. This is because, in case of three-dimension data, when a plane is rotated by 360 degrees with a given inclination relative to the horizontal plane, data never returns geometrically to the initial position after the rotation so that correction is necessary therefor. From the coordinate conversion section 232, a roll angle component (since an error is contained, "component" is used) $\Delta\alpha$, a pitch angle component $\Delta\beta$ and a yaw angle component $\Delta\phi$are outputted. Since the following processes are common to the roll, pitch and yaw angle components, explanation will be made only to the roll angle component $\Delta\alpha$.

The roll angle component $\Delta\alpha$ is branched into two through a signal branching section (not shown). One of the branched signal is fed to a dead zone processing section 233*a*, while the other thereof is fed to a highpass filter 235*a*.

Figure 10:
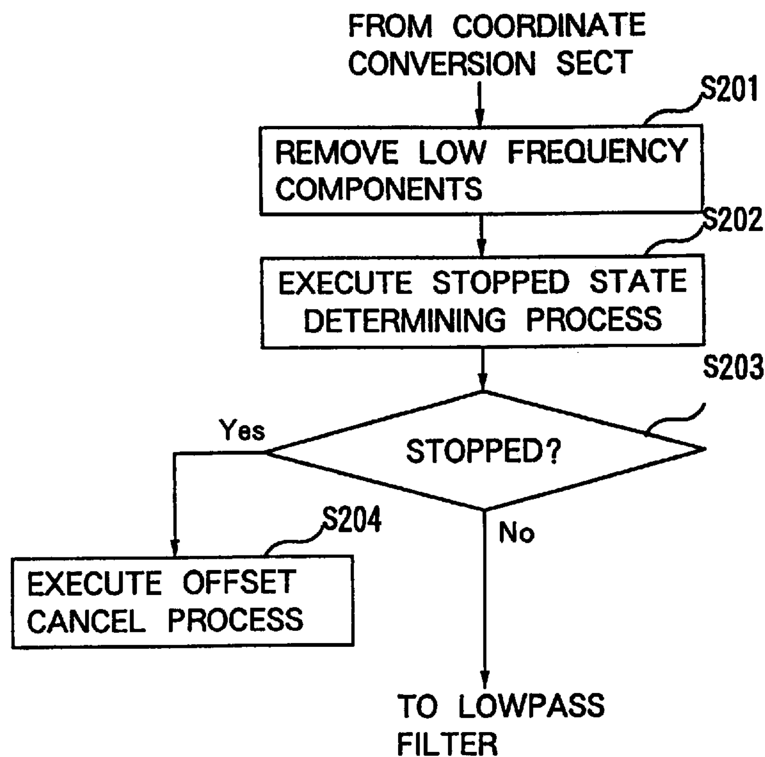
FIG. 10 is a flowchart of a dead zone process to be executed at the main control section of the three-dimensional mouse shown in FIG. 6.

FIG. 10 is a flowchart of a process performed at the dead zone processing section 233*a*. First, step S201 removes low frequency drift components from the branched signal. Then, step S202 executes a stopped state determining process. Specifically, in the stopped state determining process, variation in amplitude of the signal derived at step S201 is detected and, if the variation is within a preset dead zone, it is determined that no angular velocity is generated about the corresponding axis. If it is determined at step S203 that the angular velocity is generated as a result of execution of the stopped state determining process, the signal obtained at step S201 is fed to a lowpass filter 234*a*. On the other hand, if step determines that no angular velocity is generated, the routine proceeds to step S204 where an offset cancel process is executed.

Figure 11:
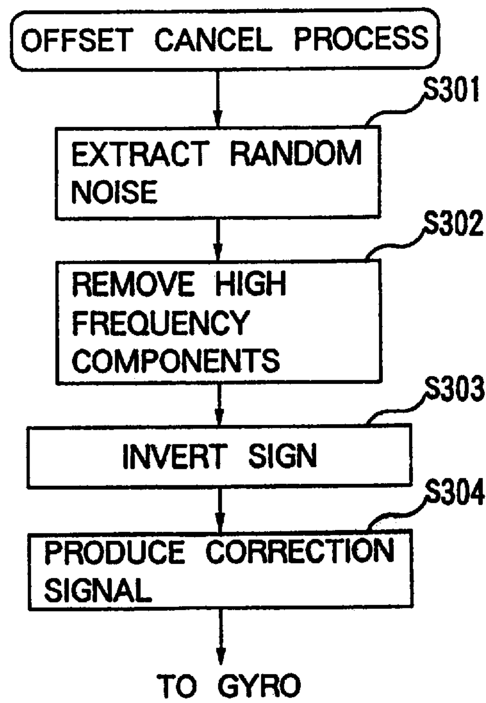
FIG. 11 is a flowchart of an offset cancel process to be executed at the main control section of the three-dimensional mouse shown in FIG. 6.
Figure 12A:
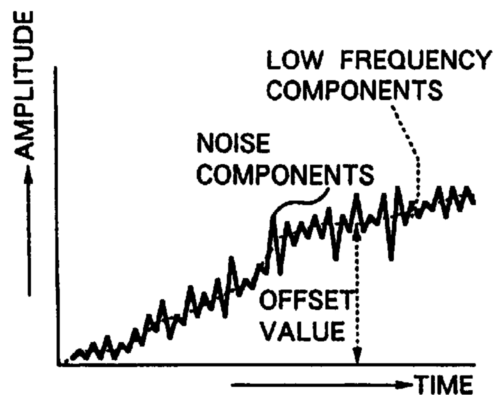
Figure 12B:
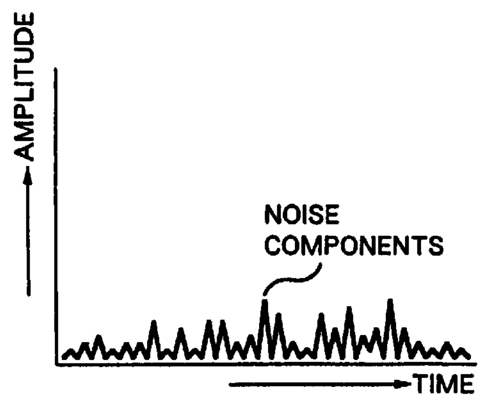
Figure 13:
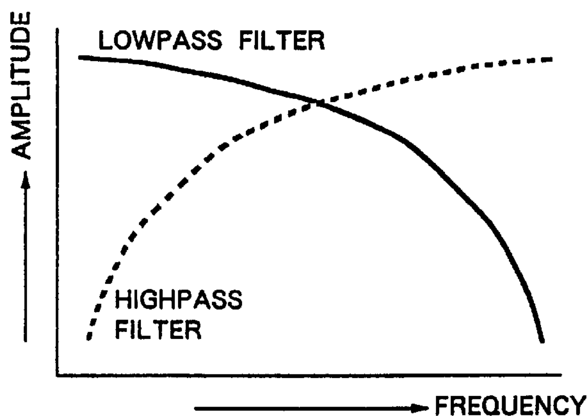
FIG. 13 is a diagram for explaining a case where signals having components in different frequency ranges are combined according to the second preferred embodiment.

FIG. 11 is a flowchart of the offset cancel process. First, step S301 extracts random noise from the signal obtained at step S201, and then, step S302 removes high frequency components from the random noise so as to derive an offset value. Subsequently, step S303 inverts a sign of the offset value, that is, inverts the positive sign of the offset value to the negative value, so that step S304 produces a correction signal indicative of the offset value with the inverted sign. The correction signal is sent to the gyro 22*a* for an offset correction. Through the execution of the offset cancel process, the branched signal having components, for example, as shown in FIG. 12A becomes as shown in FIG. 12B where the offset value has been canceled. Thus, an angular error caused by the offset value can be eliminated.

Referring back to FIG. 7, after high frequency components are removed through the lowpass filter 234*a*, the branched signal is combined with the other branched signal whose low frequency components have been removed through the highpass filter 235*a*. By combining the branched signals having different frequency components, an occurrence of an error caused by variation in frequency range can be suppressed as seen from FIG. 13.

The combined signals are sent in sequence to an integrating circuit 236*a* where the signals are integrated for every given time period (20 ms in this embodiment). In this embodiment, the trapezoidal rule integration is employed, wherein integrated values of the current cycle and the one-prior cycle are added to each other and then divided by two. As described before, since the averaging process has been performed upon digitizing the angular velocity signal, the data accuracy of the integrated values derived through the trapezoidal rule integration is very high.

An angular data generating section 237*a* derives the angular data, that is, a roll angle p, based on the integrated value derived at the integrated circuit 230*a*. The roll angle p is branched into two, one of which is feedback-inputted into the coordinate conversion section 232 as the feedback angular data as described above and the other of which is sent to a data output section (not shown).

The foregoing processes for the roll angle component $\Delta\alpha$ are the same as those for the pitch angle component $\Delta\beta$ and the yaw angle component $\Delta\phi$, and the angular data relative to the corresponding axes, that is, a pitch angle q and a yaw angle r, are outputted from angular data generating sections 237*b* and 237*c*, respectively.

The main control section 23 sends the thus produced angular data and the displacement data obtained from the mouse section 22 to a data input section of the computer via a conventional mouse interface for sending the two-dimensional data.

Figure 14:
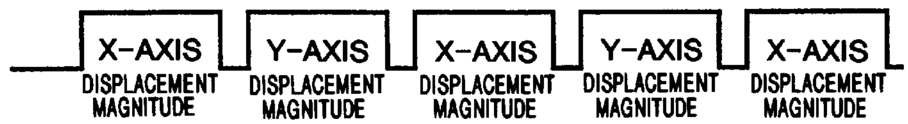
Figure 14B:
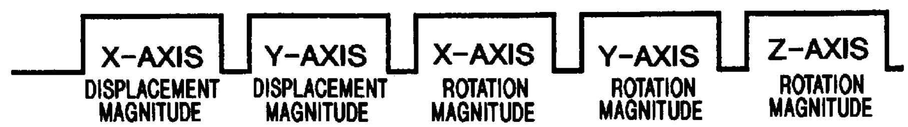
FIG. 14B is a diagram for explaining a case where three-dimensional data are transmitted using the conventional data transmission format.
Figure 15:
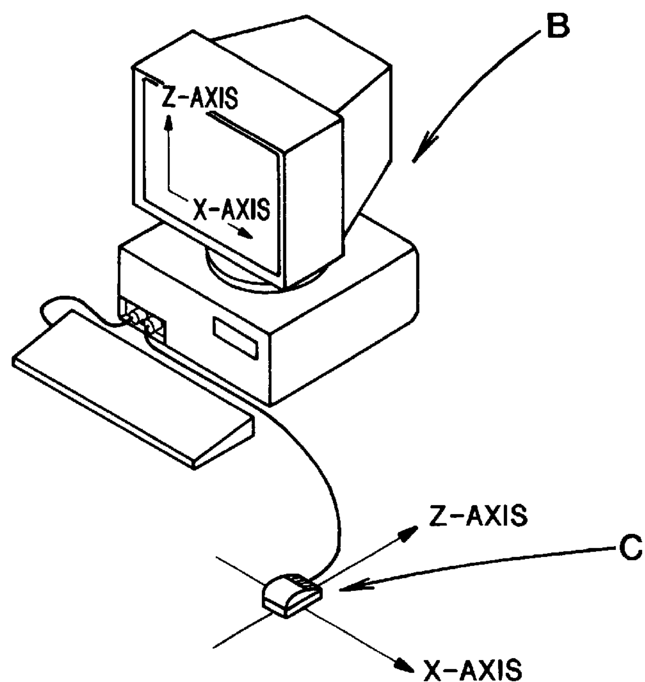
FIG. 15 is a diagram for explaining how to use a conventional mouse as an example of pointing devices.
Figure 16:
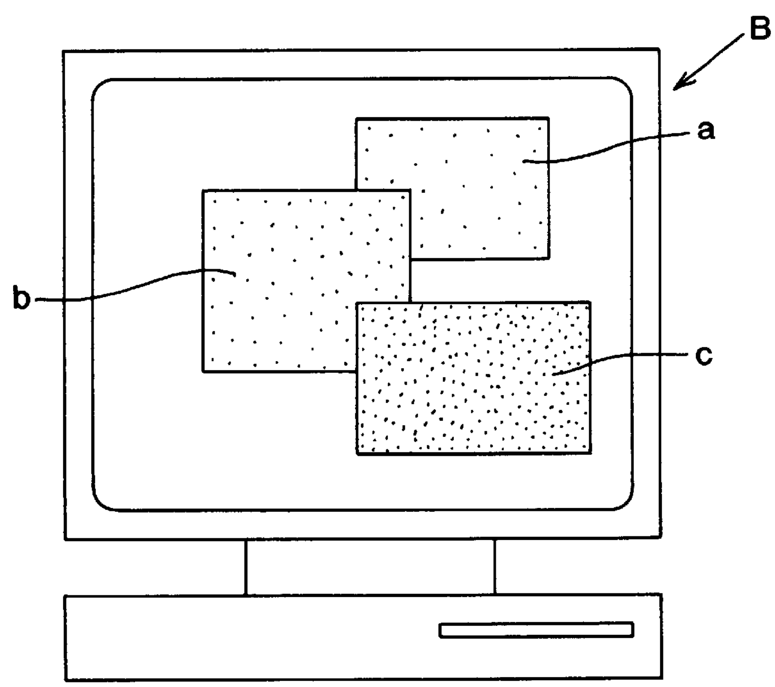
FIG. 16 is an explanatory diagram showing an example of conventional screen display of a computer.

FIG. 14A shows a data transmission format via the conventional mouse interface, wherein an x-axis displacement magnitude and a y-axis displacement magnitude as the two-dimensional displacement data are alternately transmitted. On the other hand, in this embodiment, as shown in FIG. 14B, subsequent to an x-axis displacement magnitude and a y-axis displacement magnitude, an x-axis rotation magnitude, a y-axis rotation magnitude and a z-axis rotation magnitude representing the foregoing roll angle p, pitch angle q and yaw angle r are transmitted using the conventional data transmission format. Based on these three-dimensional data, the computer performs a screen operation of a pointed object, that is, moving the pointed object on a plane corresponding to the x- and y-axes displacement magnitudes and rotating the pointed object three-dimensionally corresponding to the x-, y- and z-axes rotation magnitudes.

The three-dimensional mouse 20 according to this embodiment can be used on a desk or spacing from the desk. In the latter case, by changing an attitude or posture angle of the mouse 20, the pointed object on the screen can be rotated in a desired direction.

As appreciated, in this embodiment, the temperature correction means for the gyros are provided as in the foregoing first preferred embodiment.

Although it is preferable to use the three gyros for the roll angle (angle about x-axis), the pitch angle (angle about y-axis) and the yaw angle (angle about z-axis) as in this embodiment, it may be arranged to use only two gyros and derive a rotation angle for the third gyro through the known calculation.

As in the foregoing first preferred embodiment, as compared with the conventional mouse which performs the screen operation cooperatively with the keyboard, a large amount of data can be fed to the computer only by operating the mouse 20 so that the high-level screen operation can be achieved with simple operation.

While the present invention has been described in terms of the preferred embodiments, the invention is not to be limited thereto, but can be embodied in various ways without departing from the principle of the invention as defined in the appended claims.

For example, the present invention is also applicable to those pointing devices other than the mouse, such as a trackball or a pressing-type pointing device.

What is claimed is:

1. A three-dimensional data input device for a computer having a display screen, said three-dimensional data input device comprising:

a plurality of angular velocity sensors arranged on a plurality of axes, respectively, said axes being positioned so as to have a given angle therebetween, each of said angular velocity sensors detecting an angular velocity about the corresponding axis and producing an angular velocity signal indicative of said detected angular velocity; and angular data generating means for producing angular data each indicative of a rotation angle about the corresponding axis, based on the corresponding angular velocity signal and further based on the angular velocity signal relative to the axis other than said corresponding axis, wherein said computer rotates a corresponding object to the screen corresponding to said angular data.

2. The three-dimensional data input device according to claim 1, wherein said angular data generating means includes means for converting each of said angular velocity signals into a digital signal having a constant amplitude for a given time period, and a coordinate conversion section for converting each of said digital signals to a coordinate signal corresponding to a rotation magnitude of said corresponding object on the screen.

3. The three-dimensional data input device according to claim 2, wherein said angular data generating means includes:

a signal branching section for branching each of said coordinate signals into at least two;

a plurality of filters for removing different frequency components from the branched signals of each of said coordinate signals;

a signal combining portion for combining the branched signals of each of said coordinate signals outputted from said filters to produce a combined signal; and means for producing each of said angular data based on said combined signal, wherein each of said angular data is fed to said coordinate conversion section as a conversion parameter and as said angular velocity signal relative to other than said corresponding axis, so as to be used upon conversion to said coordinate signal.

4. The three-dimensional data input device according to claim 1, wherein said angular data generating means includes means for determining no occurrence of the angular velocity about the corresponding axis when variation of angular components contained in the corresponding angular velocity signal is within a preset dead zone of the angular velocity sensor.

5. The three-dimensional data input device according to claim 5, wherein said angular data generating means includes temperature correction means for correcting each of said angular velocity signals based on a monitored temperature around said angular velocity sensors.

6. A three-dimensional data input device for a computer, comprising:

a device body;

a two-dimensional data input portion provided in said device body, said two-dimensional data input device generating displacement signals along first and second axis on a plane, respectively in response to an information given to said two-dimensional data input portion;

a first angular velocity sensor for detecting an angular velocity applied to said device body about a third axis extending at a given angle relative to said plane and outputting an angular velocity signal indicative of said angular velocity;

at least one switch for outputting a selection signal in response to operation of said switch;

a data processing section for producing displacement data based on said displacement signals and angular data based on said first angular velocity signal and outputting said displacement data, said first angular data and said selection signal to the computer; and further including a second angular velocity sensor and a third angular velocity sensor for detecting an angular velocity applied to said device body about the first axis and the second axis, respectively, wherein said data processing section produces and outputs second and third angular data based on said second and third angular velocity signals; and wherein said data processing section includes a coordinate conversion section for converting said first, second and third angular velocity signals to first, second and third coordinate signals corresponding to rotation magnitudes about the respective axis, based on the corresponding angular velocity signal and further based on the angular velocity signals relative to the axes other than said corresponding axis.

7. A three-dimensional data input device for a computer according to claim 16, wherein said data processing section includes:

first, second and third pairs of low-pass filter and high-pass filter for respectively removing a high frequency component and a low frequency component; and first and second and first dead zone processing sections for correcting said coordinate signals when the variations thereof are within preset values, and wherein each of said coordinate signals is divided into two signals, one of said signals is fed to the corresponding dead zone processing section, and said signal passed through said dead zone processing section and the other signal is fed to the corresponding low-pass filter and high-pass filter and then combined.

* * * * *

UNITED STATES PATENT AND TRADEMARK OFFICE

CERTIFICATE OF CORRECTION

PATENT NO. : 6,164,808
DATED : December 26, 2000
INVENTOR(S) : Atsumi Shibata et al.

It is certified that error appears in the above-identified patent and that said Letters Patent is hereby corrected as shown below:

Column 11,
Claim 1, line18, "to"should read -- on --.
Claim 5, line 55, "claim 5" should read -- claim 1--.

Column 12,
Claim 6, line 36, "axis" should read -- axes --.
Claim 7, line 41, "claim 16" should read -- claim 6 --.

Signed and Sealed this

Twenty-third Day of October, 2001

*Attest:*

Nicholas P. Godici

NICHOLAS P. GODICI

*Attesting Officer* *Acting Director of the United States Patent and Trademark Office*